UNITED STATES PATENT OFFICE.

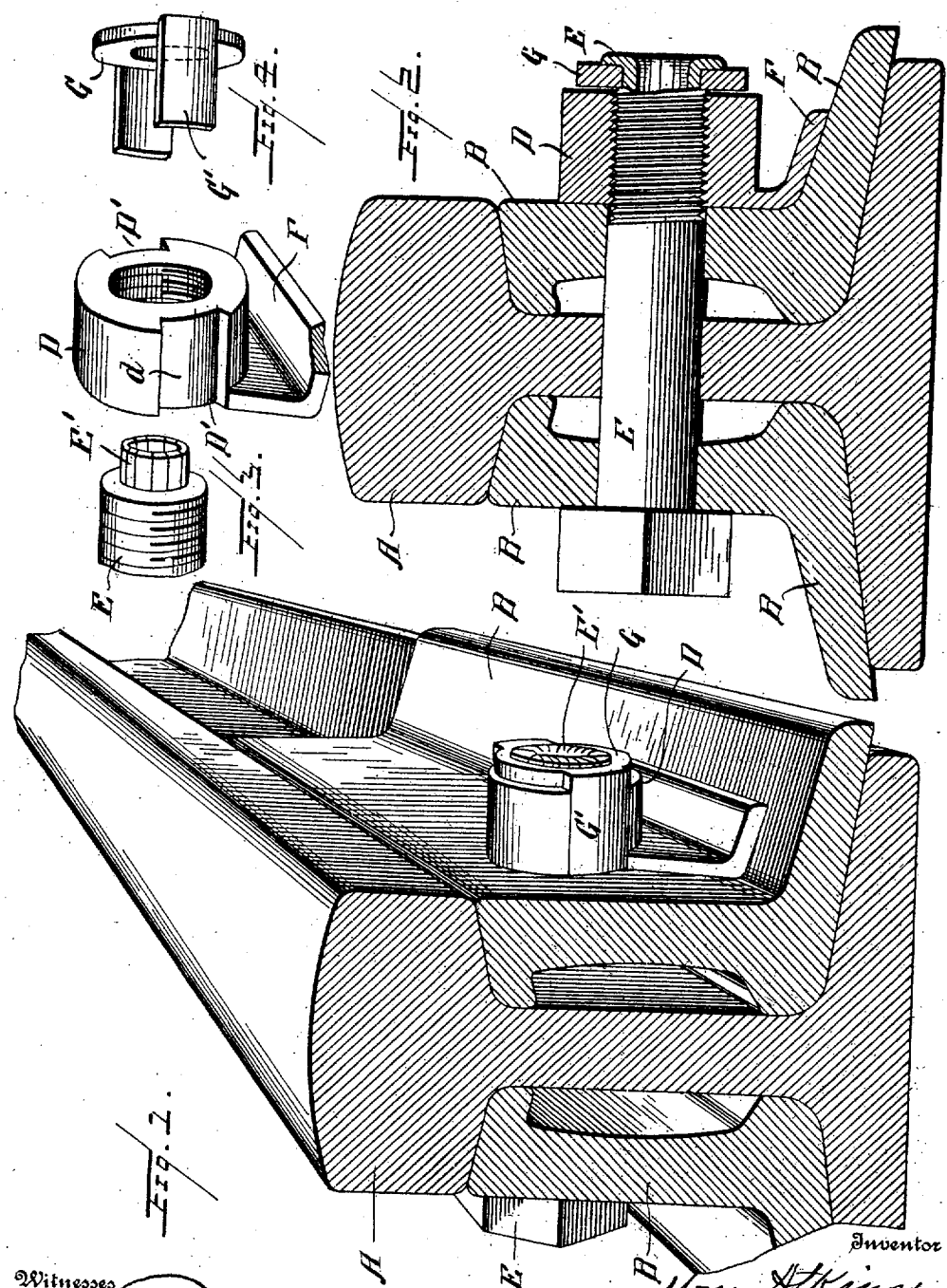

WILLIAM ATKINS, OF ST. JOHN, NEW BRUNSWICK, CANADA, ASSIGNOR OF TWO-THIRDS TO ALEXANDER W. MacRAE, OF ST. JOHN, CANADA.

NUT-LOCK.

No. 857,573.   Specification of Letters Patent.   Patented June 25, 1907.

Application filed October 18, 1906. Serial No. 339,558.

*To all whom it may concern:*

Be it known that I, WILLIAM ATKINS, a subject of the King of England, residing at St. John, in the Province of New Brunswick and Dominion of Canada, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in nut locks and the object of the invention is to produce a simple and efficient device of this nature, comprising a winged or flanged nut adapted to receive a threaded bolt and having grooves in the circumference thereof adapted to receive the wings of a washer, which is held securely in place by means of integral fingers or projections upon the end of the bolt, which fingers are clenched over the washer.

My invention comprises various other details of construction and combinations and arrangements of parts which will be hereinafter fully described and then specifically defined in the appended claims.

I illustrate my invention in the accompanying drawings, in which:—

Figure 1 is a perspective view of my improved nut lock. Fig. 2 is a sectional view through the bolt and lock. Fig. 3 is a detailed view of the winged nut and Fig. 4 is a perspective view of the washer having wings thereon.

Reference now being had to the details of the drawings by letter, A designates a railway rail, B fish-plates resting upon the flange of the rail and having registering apertures adapted to receive the bolt E, which has fingers E′ projecting from one end thereof.

D designates a nut having two grooves D′ formed at positions diametrically opposite in the circumference thereof and an integral flange F which is angled and adapted to rest upon the flange of the fish-plate.

G designates a washer having two arms or wings G′ projecting therefrom at right angles to the face of the washer and each of said arms or wings is concaved upon its inner face and adapted to fit over the convexed portion $d$ forming the bottoms of said grooves. When said arms or wings are inserted in said grooves, the outer circumference of the nut and the outer faces of the wings are flush. After the washer has been adjusted in place, the said fingers, which are integral with the end of the bolt and being of a malleable material, may readily be bent back over the washer to hold the same in place.

From the foregoing, it will be noted that, by the provision of a nut lock made in accordance with my invention, a simple and efficient device is afforded whereby a bolt may be securely held within the nut, the latter being held from rotation and the washer securely held by the malleable fingers being bent outwardly over the margin of the central aperture in the washer. When it is desired to move the bolt, the same may be done by merely unscrewing the bolt, the fingers yielding as they are drawn through the opening in the washer thus leaving the bolt in readiness for use again.

What I claim as new is:—

1. A nut lock comprising, in combination with a bolt having flexible fingers projecting from one end thereof, a nut adapted to receive said threaded bolt and provided with a flange to hold the nut from rotation, a washer engaging said nut and adapted to be held to the nut by said fingers, as set forth.

2. A nut lock comprising, in combination with a bolt having flexible fingers projecting from one end thereof, a nut having transverse grooves formed in the circumference thereof and provided with a flange adapted to hold the nut from rotation, a washer having arms projecting therefrom and adapted to engage the grooves of said nut, said finger being adapted to be bent to hold the washer upon the nut, as set forth.

3. A nut lock comprising, in combination with a bolt having flexible fingers projecting from one end thereof, a nut having an angled flange and grooves formed in said nut at the upper edges of said flange, a washer having arms projecting at right angles therefrom and adapted to engage said grooves, said fingers being adapted to be bent to engage the washer and hold the same upon the nut, as set forth.

In testimony whereof I hereunto affix my signature in the presence of two witnesses.

WILLIAM ATKINS.

Witnesses:
GEBHARD WILLRICH,
L. M. JEWETT.